Patented Jan. 19, 1937

2,068,010

UNITED STATES PATENT OFFICE 2,068,010

PROCESS FOR THE MANUFACTURE OF ACETALDEHYDE

Henry Dreyfus, London, England

No Drawing. Application August 22, 1932, Serial No. 629,905. In Great Britain October 5, 1931

8 Claims. (Cl. 260—138)

This invention relates to the production of acetaldehyde, and in particular, the separation of acetaldehyde from vaporous mixtures such as are obtained by the catalytic oxidation of ethyl alcohol.

The manufacture of acetaldehyde is carried out on a large scale by the catalytic oxidation of ethyl alcohol in the vapor phase. The reaction produces a mixture of aldehyde and water together with any unchanged alcohol. It has long been known that the presence of water vapor is very beneficial in the oxidation of alcohol to aldehyde, (see German Patent No. 168,291), the water inter alia serving to control the reaction temperature and avoid the formation of decomposition products by virtue of its diluent action and its power to absorb excess heat of reaction. The use of water as a diluent, however, increases the amount of water in the reaction product and renders it even more unsuitable or useless for direct employment in a number of subsequent manufactures, such for instance as its direct oxidation to acetic acid, than the product produced from concentrated alcohol.

I have now found that acetaldehyde may readily be separated from water vapor by absorption with solvents or other substances. According to the invention, therefore, I subject vaporous mixtures containing acetaldehyde and water vapor to treatment whereby the aldehyde is selectively absorbed.

In performing the invention I preferably employ liquids or solvents, and particularly solvents of high or relatively high boiling point, for the absorption. Solvents of high boiling point and which are insoluble or substantially insoluble in water are particularly useful. As examples of such solvents may be mentioned paraffin oil, chlorbenzene, p-dichlorbenzene, benzylether, tetrachlorethane, acetyl glycerins, e. g. triacetin, phenetol, anisol, one or more cresols, esters such as propyl or isopropyl acetates, butyl or isobutyl acetates, amyl acetate, p-cresol acetate, or mixtures of any of such solvents. I prefer to use the solvents or liquids at temperatures above the boiling point of water as by such means the aldehyde may readily be absorbed and the water allowed to escape or pass on in vapor form, particularly when water-insoluble solvents are employed for the absorption. I may however effect the absorption with water-insoluble or substantially water-insoluble solvents at lower temperatures at which the water or substantial quantities of the water condense, but such a method is not so advantageous in that it involves the removal of the subsequent condensed water from the solvent, e. g. in a separator, continuous separator, Florentine bottle or the like.

The vaporous mixtures, for example vaporous mixtures of acetaldehyde, water vapor with or without ethyl alcohol vapor such as are obtained by the oxidation of ethyl alcohol may, for example, be passed through a body of the solvent or liquid, or counter-current to the solvents or liquids in towers, columns or the like.

As above indicated, the temperature employed for the absorption is preferably above the boiling point of water, e. g. about 100° to 150° C. or more.

The aldehyde may be recovered from the absorbing liquid in any convenient way, as for instance by heating or distillation. When high boiling solvents or liquids are employed as the absorbing liquids the recovery of aldehyde is an especially simple matter. In cases where the aldehyde is to be employed for a subsequent manufacture, e. g. oxidation to acetic acid, it is often possible to use the solution of aldehyde in the absorbing solvent or liquid for such manufacture. If desired or necessary, however, the aldehyde may first be separated from the absorbing solvent or liquid (e. g. in the manner before indicated) and if desired the aldehyde vapor evaporated or distilled from the absorbing liquid or liquids may be absorbed in an anhydrous or substantially anhydrous solvent other than that employed as the initial absorption solvent or liquid (e. g. acetic acid) provided such solvent is not liable to interfere with the particular subsequent manufacture. Thus for instance acetic acid may usefully be employed in cases where the aldehyde is to be oxidized to acetic acid.

If desired or necessary the aldehyde separated from the absorbing solvent may be treated to remove any alcohol present, for instance the aldehyde vapor resulting from the heating or distillation of the absorbing liquid may, if desired or necessary, be washed with small quantities of water. It is of course to be understood that the invention is not limited as to any particular method of recovery of the aldehyde from the absorbing liquid or solvent.

According to another form of execution of the invention I may effect the absorption with solid adsorbents instead of liquids or solvents. As examples of such solid adsorbents may be mentioned active charcoal, silica gel or the like. Such adsorbents may be employed in any convenient way adapted to absorb the aldehyde selectively from the reaction vapors. Conveniently the vapors may be passed through a layer or layers of the adsorbents at temperatures near to but above the boiling point of water, e. g. temperatures of from about 101–150° C. and especially 105–120° C. The aldehyde may be recovered from the adsorbents in any convenient way, as, for instance, by heating, preferably under reduced or low pressure. As in the case of the adsorbent liquids or solvents the aldehyde recovered from the solid adsorbents may be treated to remove any alcohol, and further the aldehyde vapor may be adsorbed in acetic acid or other suitable anhydrous or substantially anhydrous solvent.

According to yet another method of separating aldehyde from the vaporous mixtures the recovery of the aldehyde is carried out continuously with the absorption thereof, and for this purpose reaction vapors of the type referred to or other vaporous mixtures containing acetaldehyde and water vapor may be passed into contact with porous diaphragms or bodies or masses of solid adsorbents whereby the aldehyde vapor and water vapor are separated from each other by a differential diffusion.

The aldehyde may be obtained by oxidation of ethyl alcohol at any convenient temperatures in presence of any convenient catalysts. In general temperatures between about 300° and 500° C. and especially 400° and 450° C. are very useful. Silver, copper, silver oxide, copper oxide, may be mentioned as instances of catalysts that are very useful for promoting the reaction. The alcohol may be submitted to the oxidation simply in the form of vapor. Advantageously, however, the alcohol vapor is diluted with steam, as, for instance, by employing the vapors of dilute alcohols. Especially useful results are obtained when dilute or very dilute alcohols, and particularly alcohols containing more than about 50% (i. e. 50 parts of alcohol to 50 parts of water) and particularly more than about 60% of water are employed. The use of such dilute or relatively dilute alcohols enables the highly exothermic reaction to be performed without difficulty in maintaining uniform reaction temperature, and the formation of the aldehyde to be attained with substantial absence of side reactions and decomposition of the alcohol. In fact, by employing very dilute alcohols substantially complete conversion of the alcohol to aldehyde may readily be effected in substantial absence of side reactions or of decomposition of the alcohol. Other diluent gases or vapors which serve to avoid or minimize side reactions or decomposition of the alcohol may be employed, for instance nitrogen or other indifferent gases may usefully be employed as diluents.

The oxygen or air employed for the oxidation may be substantially equal to that theoretically required or less than such quantity or may be employed in excess.

What I claim and desire to secure by Letters Patent is:—

1. Process for the manufacture of acetaldehyde, which comprises subjecting ethyl alcohol vapor to oxidation and separating acetaldehyde from water vapor contained in the vaporous reaction products by selective absorption of the acetaldehyde, at a temperature above the boiling point of water, in a medium chemically inert to the acetaldehyde under the conditions obtaining during the separation.

2. Process for the manufacture of acetaldehyde, which comprises subjecting ethyl alcohol vapor to oxidation and separating acetaldehyde from water vapor contained in the vaporous reaction products by selective absorption of the acetaldehyde, at a temperature above the boiling point of water, in a high-boiling solvent substantially insoluble in water and chemically inert to the acetaldehyde under the conditions obtaining during the separation.

3. Process for the manufacture of acetaldehyde, which comprises subjecting ethyl alcohol vapor to oxidation in the presence of at least its own weight of water vapor and separating acetaldehyde from water vapor contained in the vaporous reaction products by selective absorption of the acetaldehyde, at a temperature above the boiling point of water, in a medium chemically inert to the acetaldehyde under the conditions obtaining during the separation.

4. Process for the manufacture of acetaldehyde, which comprises subjecting ethyl alcohol vapor to oxidation in the presence of at least its own weight of water vapor and separating acetaldehyde from water vapor contained in the vaporous reaction products by selective absorption of the acetaldehyde, at a temperature above the boiling point of water, in a high boiling solvent substantially insoluble in water and chemically inert to the acetaldehyde under the conditions obtaining during the separation.

5. Process for the manufacture of acetaldehyde, which comprises subjecting ethyl alcohol vapor to oxidation in the presence of at least its own weight of water vapor and separating acetaldehyde from water vapor contained in the vaporous reaction products by selective absorption of the acetaldehyde, at a temperature of 105–120° C., in a medium chemically inert to the acetaldehyde under the conditions obtaining during the separation.

6. Process for the manufacture of acetaldehyde, which comprises subjecting ethyl alcohol vapor to oxidation in the presence of at least its own weight of water vapor and separating acetaldehyde from water vapor contained in the vaporous reaction products by selective absorption of the acetaldehyde, at a temperature of 105–120° C., in a high boiling solvent substantially insoluble in water and chemically inert to the acetaldehyde under the conditions obtaining during the separation.

7. A process for the separation of acetaldehyde from vaporous mixtures of acetaldehyde and large amounts of water, which comprises selectively absorbing the acetaldehyde, at a temperature above the boiling point of water, in a medium chemically inert to the acetaldehyde under the conditions obtaining during the separation.

8. A process for the separation of acetaldehyde from vaporous mixtures of acetaldehyde and large amounts of water, which comprises selectively absorbing the acetaldehyde, at a temperature of 105°–120° C., in a high boiling solvent substantially insoluble in water and chemically inert to the acetaldehyde under the conditions obtaining during the separation.

HENRY DREYFUS.

CERTIFICATE OF CORRECTION.

Patent No. 2,068,010.  January 19, 1937.

HENRY DREYFUS.

It is hereby certified that error appears in the printed specification of the above numbered patent requiring correction as follows: Page 2, first column, line 11, for the word "adsorbed" read absorbed; and that the said Letters Patent should be read with this correction therein that the same may conform to the record of the case in the Patent Office.

Signed and sealed this 2nd day of March, A. D. 1937.

(Seal)

Henry Van Arsdale
Acting Commissioner of Patents.